Sept. 29, 1959 G. WALTHER ET AL 2,906,454
TEN-KEY CALCULATING MACHINE
Filed Jan. 15, 1954 8 Sheets-Sheet 3

INVENTORS
OTTO HABERKORN,
GEORG WALTHER,

ATTORNEY

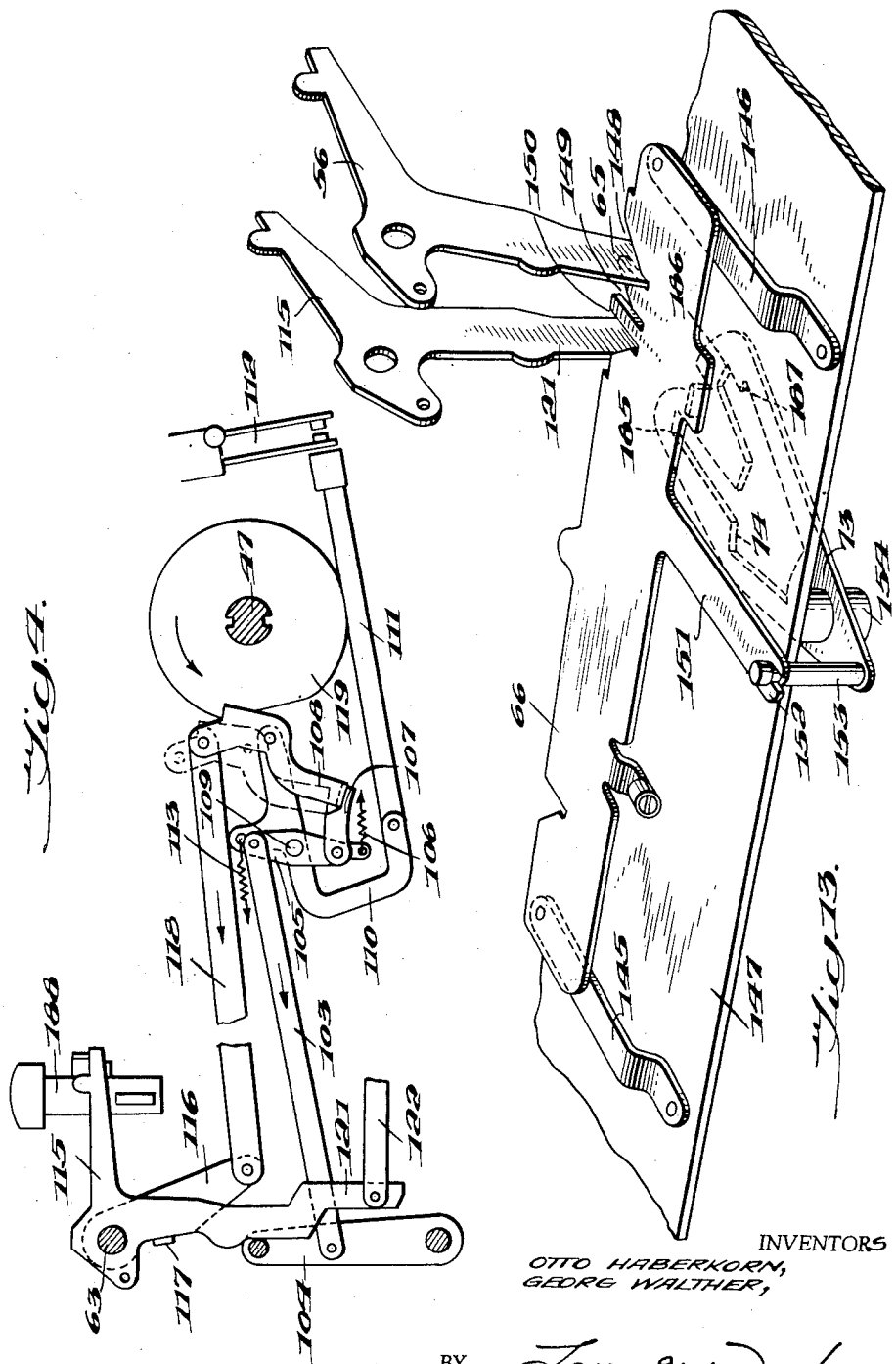

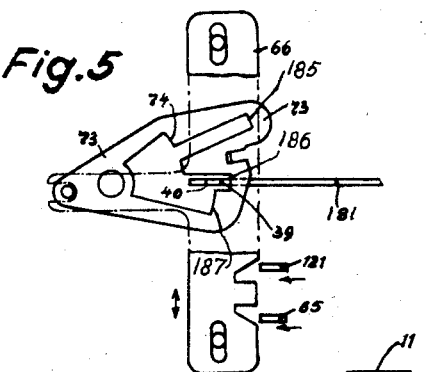
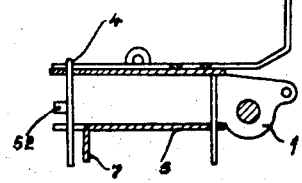
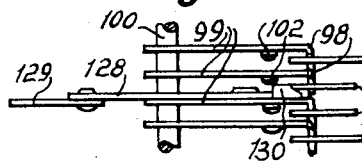
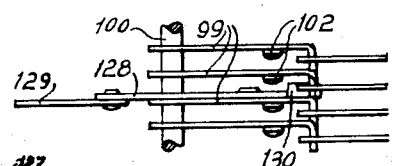
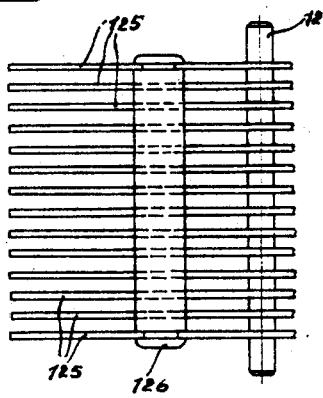
Inventors
GEORG WALTHER,
OTTO HABERKORN,
BY Robert B. ———
ATTORNEY Sept. 29, 1959   G. WALTHER ET AL   2,906,454
TEN-KEY CALCULATING MACHINE
Filed Jan. 15, 1954   8 Sheets-Sheet 6

Inventors
GEORG WALTHER,
OTTO HABERKORN,

BY Robert B Pearson
ATTORNEY

Sept. 29, 1959    G. WALTHER ET AL    2,906,454
TEN-KEY CALCULATING MACHINE
Filed Jan. 15, 1954    8 Sheets-Sheet 7

INVENTORS
OTTO HABERKORN,
GEORG WALTHER,
BY Larson and Taylor
ATTORNEY

Sept. 29, 1959    G. WALTHER ET AL    2,906,454
TEN-KEY CALCULATING MACHINE
Filed Jan. 15, 1954    8 Sheets-Sheet 8

INVENTORS
OTTO HABERKORN,
GEORG WALTHER,

BY Lawey and Taylor
ATTORNEY

United States Patent Office 2,906,454
Patented Sept. 29, 1959

2,906,454

TEN-KEY CALCULATING MACHINE

Georg Walther and Otto Haberkorn, Gerstetten, Wurttemberg, Germany, assignors to Walther & Co., G.m.b.H., Gerstetten, Wurttemberg, Germany, a corporation of Germany Application January 15, 1954, Serial No. 404,326

5 Claims. (Cl. 235—60.23)

The present invention relates to adding machines, and it primarily resides in various improvements in a mechanism for carrying out extensive multiplications on such machines having a listing or printing mechanism and a keyboard designed in accordance with a ten-key system.

It is already known to provide multiplication mechanisms for adding listing machines wherein the multiplicand and the multiplier, as well as the product are set up in the accumulator section and are then printed. Such devices, however, have the disadvantage that they require a very large number of different parts of special design, resulting in a very high purchase price of the machine, and do not give a printed result which is as clear, concise, and quickly legible as desired.

Therefore it is the principal object of the invention to design a machine of the type described above which complies with the following specifications: (1) it must permit the numerals required for the respective calculation to be set up very quickly therein, (2) it must be capable of operating as atomatically as feasable, (3) it must print a clear, concise, and easily legible result, (4) it should only require simple and inexpensive means for computing and printing such result, and (5) it should permit a multiplication to be carried out by using the parts required for addition, merely by splitting up such parts.

It is one of the important features of the invention to divide the entire adding mechanism into a multiplicand section and a multiplier section, the essential elements of which are of identical shape.

It is another feature of the invention that the multiplicand and multiplier values are printed on the tape separately from each other, and without showing the values of the intermediate computation.

Another feature of the invention consists in separately setting up the two sections of the adding machine in a pin carriage of a type kown as such, and in merely requiring for such setting up the means which are needed for connecting the drive mechanism. Thus, one side of the adding mechanism, i.e. the so-called multiplicand section, is to be set up for the desired number with several decimal places, while a representation of the number "one" is set up on the other side. Both numbers thus set up at their respective sides are then added in the various decimal places in accordance with the number of the multiplier, so that finally in the accumulator as well as in the printing sections the product appears at the right side and the complete multiplier at the left side.

It is another feature of the invention that while the intermediate computation is being carried out in the machine, the printing mechanism is disconnected, so that at this time only the multiplicand, the "equal" (=) and "times" (×) symbols, as well as the multiplier appear on the tape.

Another feature of the invention resides in the use of a "live bridge," a mechanism well known for other purposes, as shown for example in the patent to Dalton No. 1,049,057, and in dividing or "splitting" such bridge into two sections or parts. If the entire capacity of the machine consists, for example, of 14 decimal places, the invention provides for splitting them up in, for example, 10 places for the multiplicand and 4 places for the multiplier. The two values should, however, be kept strictly apart from each other during the calculation and must not intermix. Therefore, between these two values a number of decimal places shold remain free, and the ten-transfer of the multiplicand should not move over into the multiplier. These objects are solved by the use of a split live bridge, as above defined.

Still another feature of the invention resides in a device wherein the live bridge may either be split into two sections for the purpose as described, or these two sections may be combined into a single unit. This feature permits ordinary additions to be carried out in the machine when the resulting value might exceed the number of decimal places provided solely by the multiplicand section, in which event, by the simple flipping of a lever, both sections, i.e. the multiplicand and multiplier sections, may be combined, allowing all the decimal places provided in the machine to be used to indicate the sum of an addition requiring, for example, 14 decimal places.

Obviously, when speaking in this description of certain values or of a certain number of elements or decimal places it is to be understood that the capacity of the machine may, by a mere duplication or reduction of elements, be enlarged or reduced to any size desired.

These, as well as still other objects, features, and advantages of the present invention will appear from the following detailed description thereof, and the accompanying drawings, wherein like reference numerals represent corresponding elements in the various views, and which illustrate one embodiment of the invention in the form of a multiplicating mechanism as combined with an adding machine using the ten-key system.

Fig. 1 of these drawings shows a diagrammatic top view of the pin carriage together with the accumulator and the type wheels in their starting position;

Fig. 2 is similar to Fig. 1, except for the fact that the multiplicand and a representation of the numeral "1," i.e. the first computing number, have been set up in the pin carriage and that the machine has carried out its first revolution for the purpose of multiplying;

Fig' 3 is a side view of the machine in which the parts which are not essential for the invention have been omitted;

Fig. 4 is a detail side view of the one-revolution clutch of the machine in combination with a key lever and the connecting elements thereof;

Fig. 5 is a top view of the stop plate with the cooperating guide bar and the tracing ends of the tracer bars;

Fig. 6 is a section taken along line VI—VI of Fig. 2;

Fig. 7 is a top view of the balancing bridge;

Fig. 10 shows a fractional view of the live bridge for the levers of the type wheels, with the connecting slide in the retracted position;

Fig. 11 shows the same view as Fig. 10, but with the connecting slide in the engaged position.

Fig. 13 is a perspective view of the key levers with the guide bar for the stop plate;

Fig. 14 is a side view of the printing mechanism; while

Figure 1:
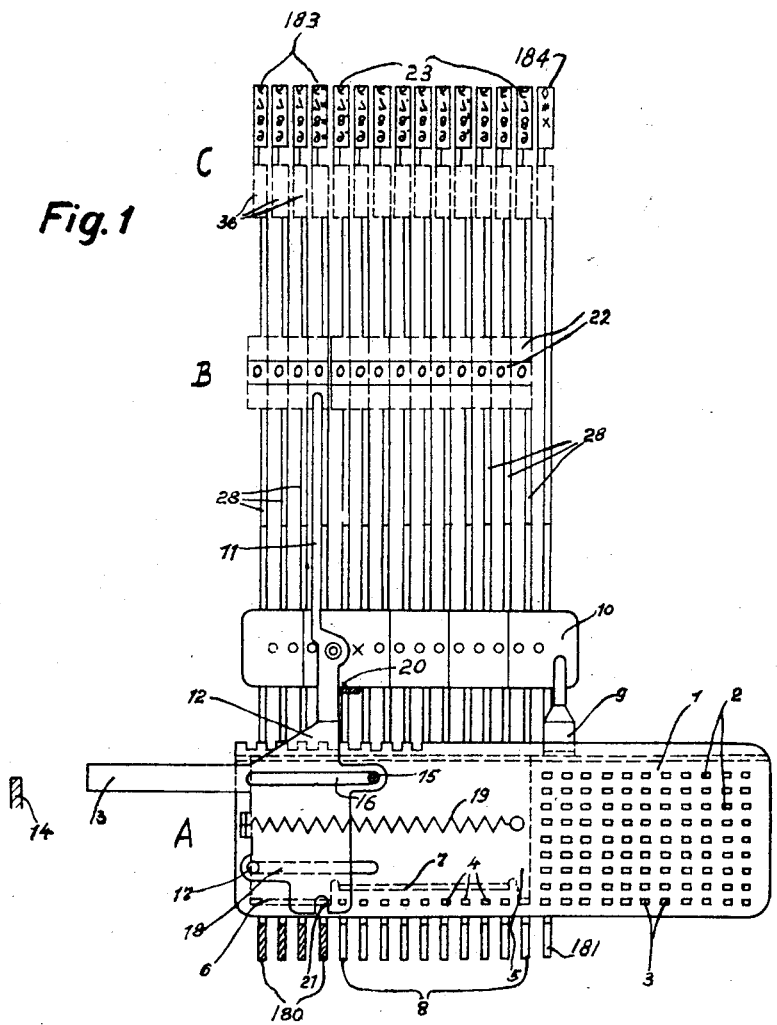

In the following description the computing machine according to the present invention will be divided into three sections, i.e. the key section A, the accumulator or computing section B, and the listing or printing section C.

Key section

The key section A substantially consists of a ten-key board comprising a pin carriage 1 with numeral stops 2, zero stops 3, and zero setting pins 4 for setting the representation of the number "one" of the multiplier mechanism. Mounted on the pin carriage 1 is the usual stop plate 5 with a stop rail 6 which extends in line with the row of zero setting pins 4, as well as with a stop rail 7 which extends in line with the one-row of the numeral stops 2. Below the pin carriage 1 are mounted the sensing bars 8, 180 and 181 which transmit the value set up in the stop carriage to the accumulator section B and the printing section C. The pin carriage 1 also has secured thereto the place indicator 9 for indicating the decimal place on the place board 10, while another place indicator 11 extends from a plate 12 which is slidably mounted on the pin carriage 1, and has an extension 13 for limiting the extent of its movement relative to a stationary stop 14 on the machine frame. The plate 12 with the indicator 11 is slidably supported on the pin carriage 1 by means of a rivet 15 secured to the pin carriage 1 and engaging in a slot 16 of the plate 12, as well as by means of a rivet 17 secured to the plate 12 and engaging in a slot 18 of the pin carriage 1. A spring 19 tends to draw the plate 12 toward a stationary stop 20. The plate 12 of the adjustable indicator 11 of the multiplier unit has a notch 21 in which a zero setting pin 4 may be inserted so as to engage the place indicator 11 with the pin carriage 1.

Accumulator section

The accumulator or computing section B, just like the key section A, is divided into two groups, the right group in the following description being called the multiplicand section and the left group the multiplier section. The multiplicand section may comprise the number wheels 22 with, for example, 10 places, while the multiplier section may comprise number wheels 182 with four places.

Printing section

The listing or printing section C which contains the type wheels 23 is likewise divided into two groups, that is, the multiplicand section with the type wheels 23, and the multiplier section with the type wheels 183. In addition, a type lever 184 is provided for printing the desired symbols. Furthermore, the type wheel 182 in the units place of the multiplier section not only carries the numerals like all the other wheels, but also an equal (=) sign thereon. The numerals on the type wheels 23a of the multiplicand section may also be distinguished from those of the type wheels 182 of the multiplier section by providing them with a different sort of type.

Figure 3:
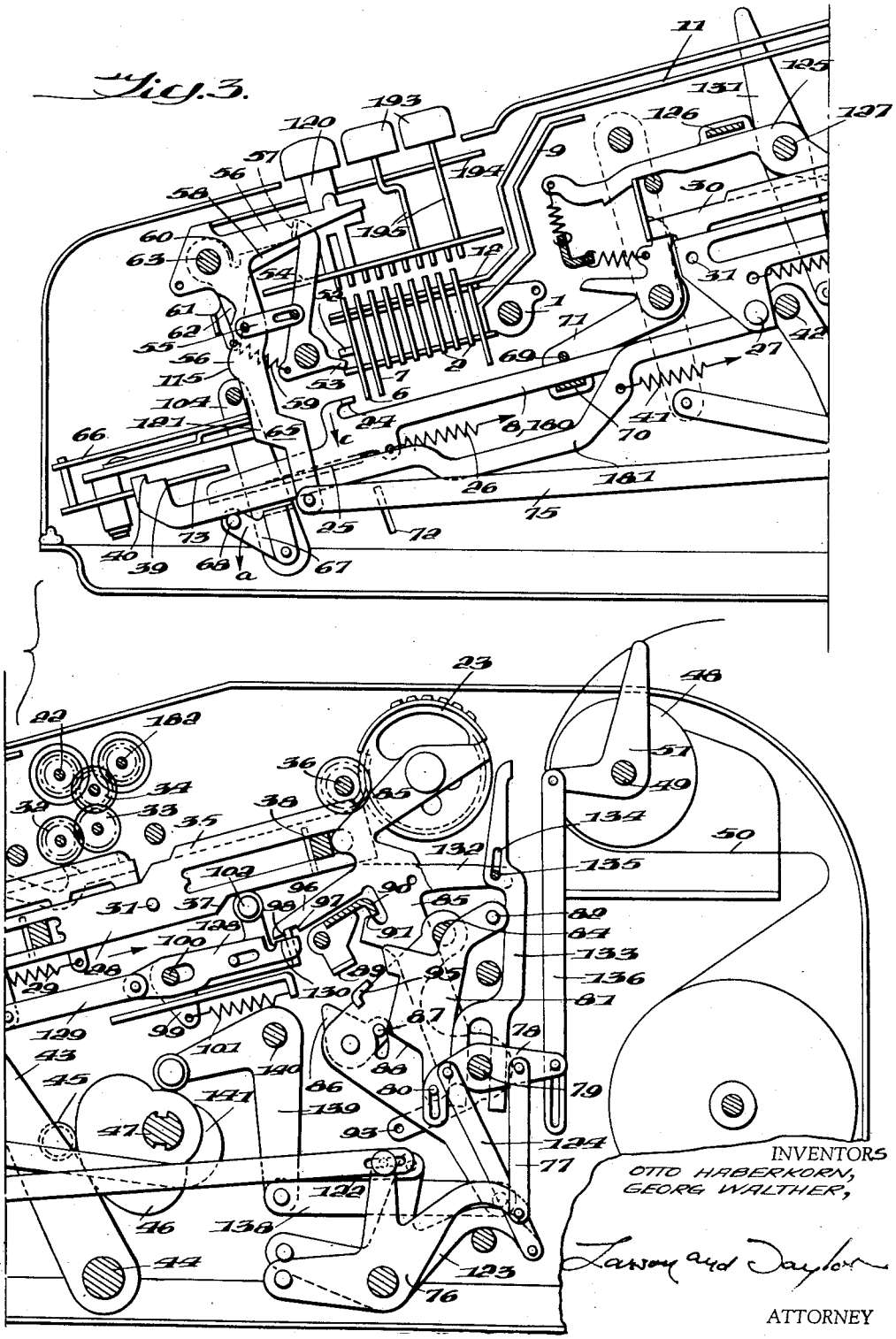
Figure 12:
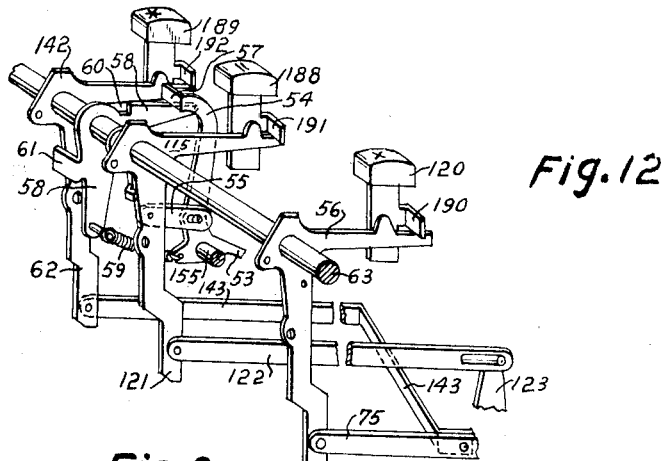
Fig. 12 is a perspective view of the key mechanism.

As shown in Fig. 3, the identical sensing bars 8 and 180 below the pin carriage 1 have at the upper side near their left end a finger 24 and at their lower sides a rack 25. Each individual sensing bar 8 and 180 is drawn toward the right by a spring 26 secured to the machine frame, and is pivotally mounted by a shoulder rivet 27 on an adding rack bar 28. A rack 30 is mounted for longitudinal movement with the rack bar 28 by a pin and slot connection 31 against the action of a spring 29 secured to the bar 28. Depending upon whether an addition or a subtraction is to be made, either the pinion 32 or the pinion 33 of the accumulator mechanism may be engaged with the teeth of the rack 30. Pinion 33 meshes with an intermediate pinion 34 and this, in turn, with the teeth of the two number rollers 22 and 182 which may be read through a window in the machine cover. Each of the rack bars 28 has at its right end a rack 35 which engages a pinion 36, the teeth of which, in turn, mesh with the rim gear on each of type wheels 23. Each of the rack bars 28 has an offset portion 37 and is slidably mounted on transverse comblike bars 38.

Aside from the sensing bars 8 and 180, and adjacent thereto, the machine is also provided with a sensing bar 181 which is pivotally secured by a shoulder rivet 27 to a slide bar 28 similar to those carrying the bars 8 and 180. The left end of this bar 181 has an angular portion forming stops 39 and 40. A spring 41 secured to the frame tends to draw the bar 181 toward the right. The rack 35 of the bar 28 which is connected to the bar 181 meshes with a pinion 36 which in turn meshes with the gear of a type wheel 23c carrying the symbol types. Acting upon all of the adding racks 28 is a single restoring rod 42 mounted between levers 43 on a shaft 44. Each of the levers 43 carries a wheel 45 which is engaged by one of the cam plates 46 on the main drive shaft 47. Thus, when the latter rotates, the cams 46 pivot the levers 43 toward the left so that the restoring rod 42 pushes against the sensing bars 8 and 180 and 181 to restore them against the action of the springs 26 and 41 to their starting position.

At the right of the type wheels 23 as seen in Fig. 3, the platen 48 is journaled in a shaft 49 so as to transport the paper tape 50. The shaft 49 also has secured thereto a control lever 51 for shutting off the tape transport.

As shown in Figs. 3 and 6 each of the zero setting pins 4 is provided with a lug 52 which is adapted so as to be acted upon by a finger 53 on a retracting lever 54 which is connected by a link 55 with the equal-sign key lever 115. The retracting lever 54 has at its upper end a lateral lug 57 which engages a locking lever 58 through the action of a tensile spring 59. The lever 58 is provided with a notch 60, in which the lateral lug 57 is adapted to engage to lock the lever 54 in retracted position. The locking lever 58 is provided with another lateral lug 61 which is adapted to be engaged by the total-key lever 62 of a shape similar to that of the equal-key lever 115, which, together with the locking lever 58 and the other key levers, is journaled on the same shaft 63. The "×" or times-key lever 56 is on the same shaft 63 and connected to the times key 120 has a downwardly extending arm 65 which, when pivoted toward the left, as viewed in Figs. 3 and 5, engages a guide plate 66 for adjusting a stop plate 73 to one or another of several positions. The arm 65, when pivoted, also acts upon one arm of a bell crank 67, the other arm of which carries a pin 68 to pivot the symbol sensing bar 181 upwardly or downwardly about the rivet 27 on the rack bar 28.

The sensing bars 8 and 180 lie intermediate to transverse bars 69 and 70 mounted between levers 71 so as to pivot them from their upper operative position downwardly in the direction indicated by the arrow C or vice versa, that is, either into an intermediate position in which the fingers 24 freely pass below the stop pins 2 of the pin carriage 1 and above a pawl bar 72, or into the lower end position wherein their ratchet teeth 25 engage the pawl bar 72 so as to arrest them in their respective adjusted position until they are retracted by the restoring rod 42. In order to further adjust the machine to carry out a predetermined function a variable stop plate 73 with different stops 74, 185, 186, 187 is provided as shown in Figs. 3 and 5, so as to be selectively engaged by one or the other of the stops 39 and 40 at the left end of the sensing bar 181, when the plate 73 is turned about a substantially vertical axis by the arm 65 of the times-key lever 56 acting upon the guide bar 66. This arm 65 is also pivotally secured at its lower end to a rod 75 for controlling the operation of the recording and printing mechanism.

Figures 8, 9:
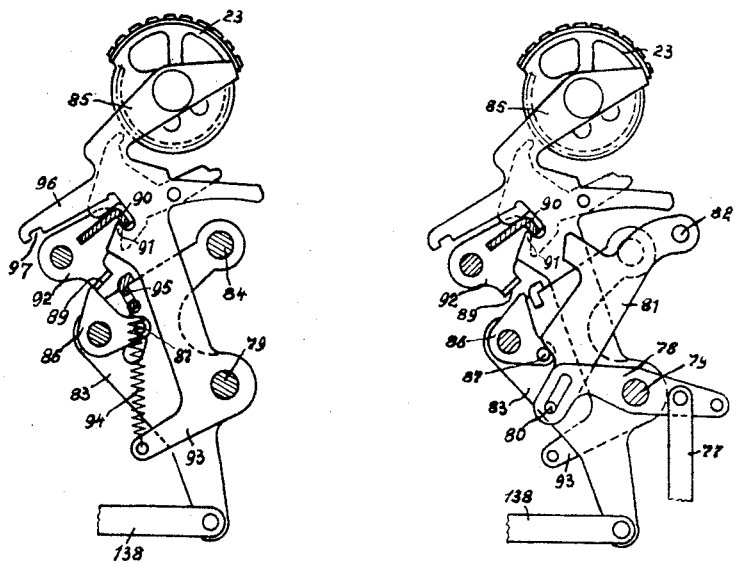
Fig. 8 is a side view of the printing mechanism in the active position.
Fig. 9 is a side view of the printing mechanism together with its control elements in the inactive position.

For this purpose the rod 75 has a lost motion connection with one arm of a bell crank 76, the other arm of which is pivotally connected through a link 77 with a two-armed lever 78 which is journaled on a shaft 79 and provided with a slot in which a pin 80 on a lever 81, which is journaled on a bolt 82, is adapted to slide. The shaft 79 also carries a pair of levers 83 between which a transverse bar 84 is mounted which rests against the type lever 85 when the latter is in the inactive position, as shown in Fig. 3. Journaled on the lever 83 is also a pawl 86 with a pin 87. This pin 87 is positioned so as to face the edge 88 of the lever 81, while the nose of the pawl 86 faces a lug 89 on a ratchet 92. As illustrated in Figs. 3, 8, and 9, the lock bar 90 engages behind a nose 91 on the type lever 85 to hold it in retracted position as long as the ratchet 92 is in the inactive position. Each of the type levers 85 has at its lower end an arm 93 for securing a spring 94, the other end of which is hooked into an eyelet 95 on the control lever 83. The type lever 85 also has near its upper end an arm 96 with a notch 97 in which engages a nose 98 of the elements 99 of a live bridge. The elements 99 are pivotally mounted on a common shaft 100, and each of them has a wheel 102 projecting upwardly and into engagement with the respective rack bar 28 by the action of a spring 101 tending to pivot the element counterclockwise about the shaft 100.

The well-known live bridge comprising the elements 99 is interrupted or split between the two groups of the accumulator mechanism, that is, the multiplier and the multiplicand sections. The gap between them may be bridged by a slide 128, as shown in Figs. 10 and 11, which is slidably mounted on the last element 99 of the multiplicand section of the live bridge, and has a lug or head 130 at one end which may be slid under the first element 99 of the multiplier section. For thus engaging or disengaging the two sections or groups, a hand-operated lever 131 is journaled on the shaft 127 and pivotally connected by a link 129 to the slide 128.

The live bridge as above defined operates in connection with a one-revolution clutch, separately illustrated in Fig. 4. It consists of a link 103 which pivotally connects lever 104 with one end of a two-armed lever 105, while the other end thereof has pivotally mounted thereon a pawl 107 which, by the action of a spring 106, engages with the lower end of another pawl 108, which, when in released position, engages with a clutch disk 119. The two-armed lever 105 is journaled on a stationary shaft 109 which also supports an angular lever 110, one arm of which supports the pawl 108, while the other angular arm has pivotally connected thereto, a switch control rod 111 which is adapted to hit against the contact spring 112 so as to close the electric circuit of the motor of the machine to drive the shaft 47. A spring 113 on the lever 110 tends to pivot the same in a counter-clockwise direction.

The lever 104 for starting the operation of the machine also rests against the "equal" key lever 115 which has the same shape as the "X" or times-key lever 56. A lever 116 for effecting a continuous operation of the machine is mounted on the shaft 63 and has a lateral lug 117 resting against the "equal" key lever 115 so as to be pivoted therewith. The lever 116 is connected by a link 118 to the pawl 108 which engages with the clutch disk 119 on the main drive shaft 47. Thus, as long as the "equal" key 188 is held depressed, the pawl 108 is retracted from the clutch disk 119 permitting it to rotate continuously, whereas, ordinarily, the tooth therein only permits a single revolution of the main drive shaft 47. The lower end 121 of the equal sign key lever 115 has pivoted thereon a rod 122 which, as shown in Fig. 3, has an elongated slot at its other end in which one arm of a bell crank 123 is slidably and pivotally secured, while the other arm thereof is pivotally connected by a link 124 to the left arm of the two-armed lever 78.

Above and transverse to all of the ten-key levers 125, which are journaled on the shaft 127, lies a balancing bridge 126, as shown in Figs. 3 and 7, which is connected to the first and the last ten-key lever 125.

Since the numeral type wheels 23 are quite thin and narrow, there is very little space on the units wheel 183 of the multiplier section for holding both the numerals and the equal (=) sign. The invention therefore also provides for a lever 132, shown in Fig. 3, which is between the two adjacent levers for the type rollers 23 and 183. This lever 132 controls a separate equal-type lever 133 and is engaged only when required. The equal-type lever 133 has a bifurcated lower end for slidably mounting it on the shaft 79, and a slot 134 near its upper end which engages a pin 135 on the lever 132 which does not carry any type wheel 23 of its own, but only the type with the equal (=) symbol directly thereon. The control lever 51 for actuating the platen 48 is connected by a rod 136 with the two-armed lever 78 which operates the pawl 86 through the lever 81.

The amount keys 193 are carried by frame 194 over the stop pins 2 and 3. The multiplicand is introduced into the pin carriage by the downward movement of the keys to depress the stop pins.

After the multiplicand has been inserted and the times key depressed, the respective values are listed by the printing mechanism which is automatically engaged by means of the connecting rod 75, the link 77, and the two-armed lever 78. However, while carrying out the actual computation the printing mechanism is set at rest by the equal (=) sign key 188.

The control lever 83 is also pivotally connected at its lower end by a link 138 with one arm of a bell crank 139 which is journaled on a shaft 140 and carries on its other arm a wheel which rests upon a cam 141 on the drive shaft 47.

The operation of the new machine will now be described by means of a practical example in which the multiplication of the numbers 137250×2817 is illustrated.

First by depressing the amount keys 193 of the well-known ten keyboard, the multiplicand 137250 is set up in the pin or stop carriage 1 and then, by depressing the ×-key 120, the ×-key lever 56 is pivoted by the lug 190, whereby the arm 65 (see Figs. 3, 5, 12, and 13) acts upon the guide bar 66 which is pivotally mounted on arms 145 and 146 which, in turn, are mounted on a stationary plate 147. Guide bar 66 is provided with inclined notches 148, 149, and 150, one of which, i.e. notch 148, faces the arm 65 of the ×-key lever 56 which when pivoted acts upon the inclined edge of the notch 148 and thus shifts the guide bar 66 (see Fig. 13). Guide bar 66 further carries an arm 151 having a bifurcated portion 152 into which a pin 153 engages which is rigidly mounted on the symbol stop plate 73 which, in turn, is pivoted about a pin 154 on the stationary plate 147 when guide bar 66 is being shifted so that the stop 186, provided for the numbers symbols is placed within the range of movement of the stops 39 and 40 of the symbol tracer bar 181. At the same time, the ×-key lever 56, 65 pivots the bell crank 67 in the direction of the arrow a, so that the pin 68 thereof allows pivoting of the symbol tracer bar 181, which is impelled by the spring 41. Thus, the stop 40 faces the stop 186 of the stop plate 73, and the tracer bar 181, impelled by the spring 41, can run rearward until its stop 40 contacts the stop 186, whereby the symbol type lever 184 is so adjusted by the rack bar 28 and the pinion 36 that a times (×) symbol faces the platen 48.

Figure 14:
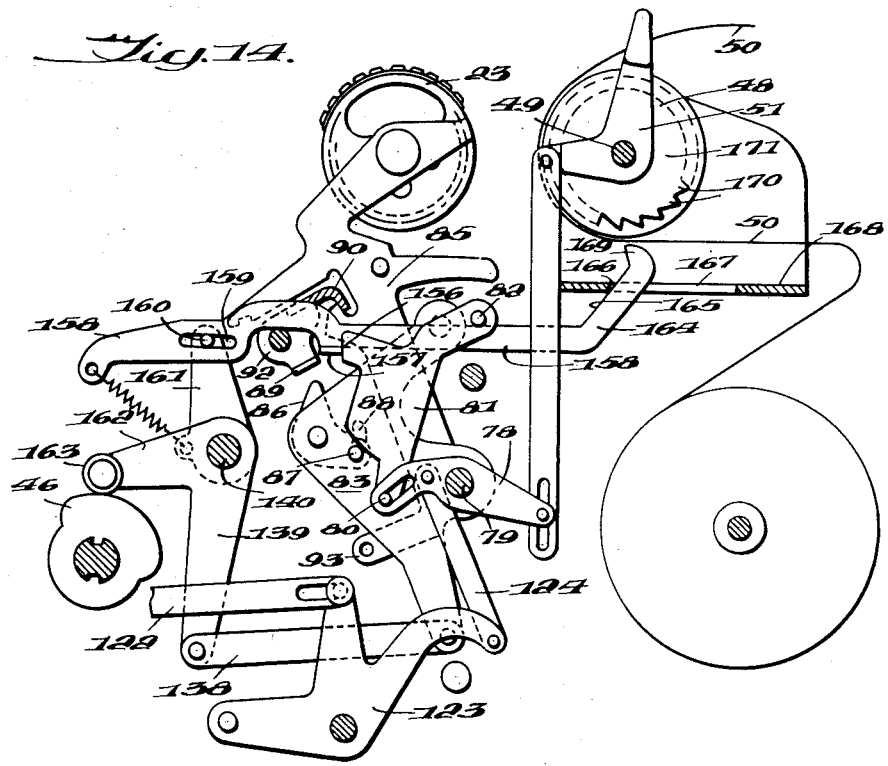
Figure 15:
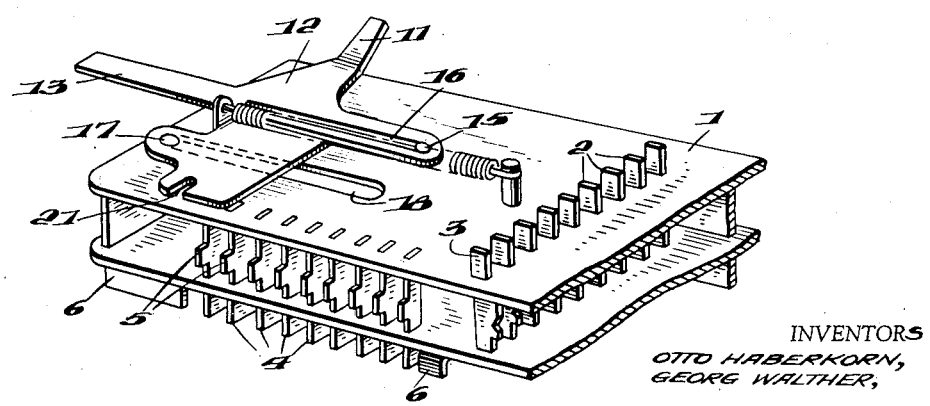
Fig. 15 is a perspective view of the pin carriage.
Figure 16:
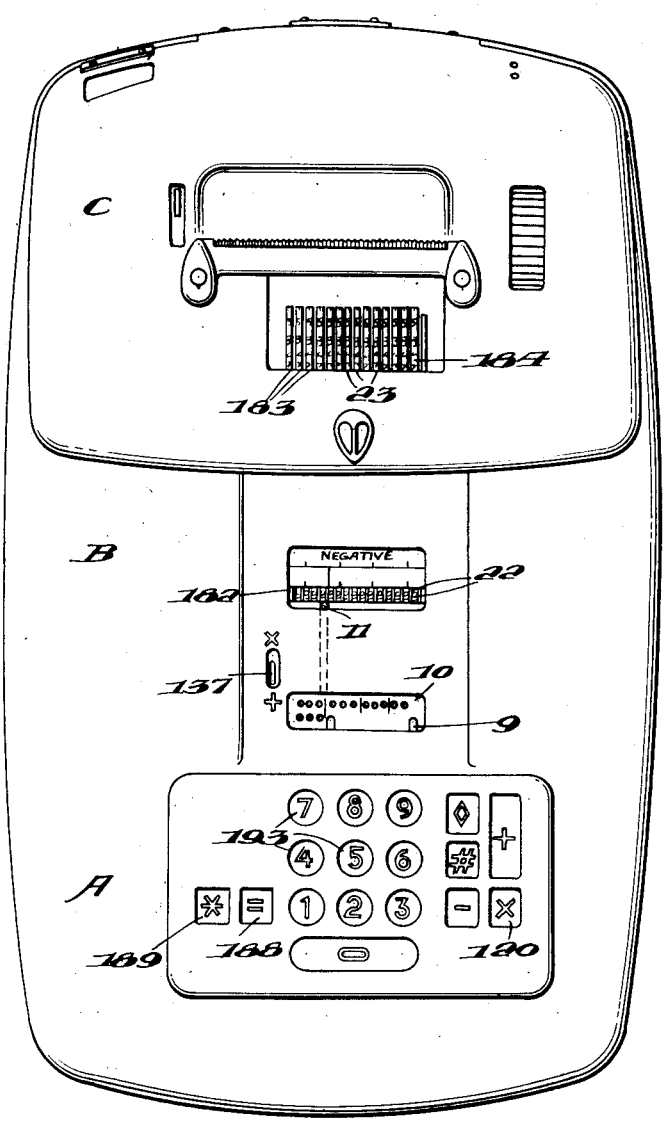
Fig. 16 is a top view of the adding machine.

The accumulator mechanism is as such well known in the art. In its neutral position the pinions 32 and 33 thereof are not engaging the racks 30. When as in other machines, the customary non-adding key is depressed, the accumulator is not actuated when the ×-key is depressed, so that in such position no numerals will be added into the accumulator. The lower end 65 of the ×-key lever then shifts the pivoting rod 75 (see Figs. 3, 12, and 14) so as to control the printing mechanism in the disconnected position, as previously described. The operation of the accumulator mechanism is started by the action of the guide plate 66 in the same manner as when printing the numerals when the pinions 32 and 33 are not engaged by the rack 30. In the final phase of its movement, the downwardly depending arm 65 of the ×-key lever 56 starts the operation of the machine by pivoting the control lever 104 toward the left, as viewed in Figs. 3 and 4, thereby turning the two-armed lever 105 and the pawl 107 counterclockwise so as to release the pawl 108 of the one-revolution clutch 119, and at the same time pivoting the angular lever 110 so that the switch control rod 111 closes the contacts 112 to start the motor. When the machine starts to run, the value of the multiplicand which has been set up in the pin carriage 1 is transmitted in a known manner by the rack bars 28 and the pinions 36 to the type wheels 23, and the respective value is printed together with the X-symbol on the paper tape 50 in the same manner as when printing the numbers. In the meantime, the X-key lever 56 has, in the same manner as when repeating, also disconnected the restoring mechanism of the pin carriage 1, which is described in U.S. Patent 2,823,854, so that the multiplicand remains set up in the pin carriage 1. Thus, the tape has printed thereon:

137250×

Figure 2:
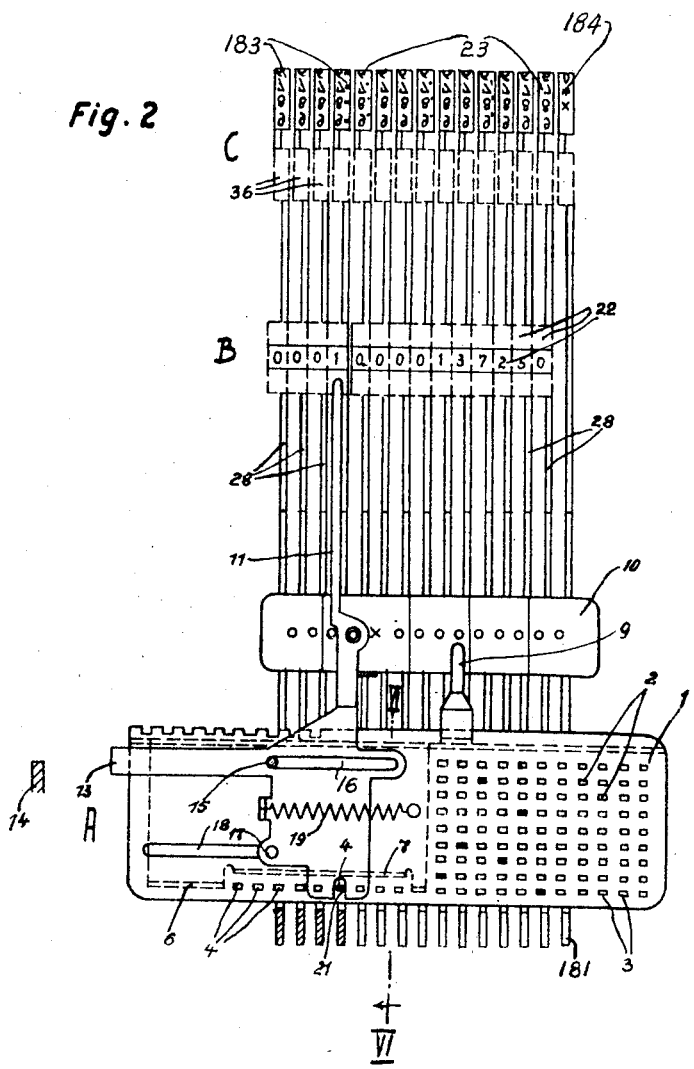

Thereafter, by depressing the equal (=) sign key 188, the equal key lever 115 is pivoted which likewise disconnects the restoring mechanism of the pin carriage 1 and moves the retracting lever 54, which is pivotally mounted on a shaft 155, by means of the link 55 so that its finger 53 lifts the lug 52 of the corresponding zero setting pin 4, which thus moves upwardly, and enters the recess 21 of the plate 12 of the plate indicator 11, while simultaneously the plate 12 is coupled with the stop carriage 1 (see Fig. 2). When pivoting the retracting lever 54, its lateral lug 57 engages with the notch 60 of the locking lever 58 which, impelled by the spring 59, locks the retracting lever 54 in such position. At the same time, the pivotal movement is transmitted by the equal-key lever 115 through the rod 122, the bell crank 123, and the link 124 to disengage the printing mechanism and the line space mechanism of the platen 48. The link 124 is pivotally connected with the two-armed lever 78 which, in turn, pivots about the shaft 79, as previously described. If the equal-key is depressed, bell crank 123 pivots counterclockwise and presses the link 124 upwardly. The latter then pivots the two-armed lever 78 clockwise which by pin 80 pivots the lever 81 clockwise about the pin 82 so as to move the same from the position shown in Fig. 3 to that shown in Fig. 14. In so doing, a lug 156 engages with a stop 157 on a control rod 158 which is connected by a pin-and-slot connection 159, 160 with the arm 161 of the bell crank 139. The latter has a third arm 162 which engages by a roller 163 with the cam 46. Control rod 158 has a bent portion 164, the edge 165 of which slides along the edge 166 of a slot 167 in a stationary plate 168. The end of the control rod 158, 164 has a detent 169 which engages with the teeth 170 of a ratchet wheel 171 on the platen 48. In the position shown in Fig. 14, control rod 158, 164 is locked so that pin 160 slides along idling within slot 159 when the bell crank 139 is actuated. The operation or engagement of the platen-actuating mechanism is the reverse to what has just been described. If the platen 48 is to be engaged or disengaged manually, control lever 51 will be pivoted by hand so that rod 136 will then transmit the same pivotal movement. In the final phase of its movement, the "equal" key lever 115, through the control lever 104 and the draw bar 118 (see Fig. 4), starts a continuous movement of the machine for as long as the key 188 is held depressed.

The stop rail 7 for the sensing bars 180 on the stop plate 5 is stationary on the pin carriage 1 so that in each decimal place only one of these four bars is able to advance up to the stop rail 7, i.e. up to the place value "one," where the zero-setting pin 4 is pushed upwardly. The other tracer bars 180 together with their respective rack bars 28 are prevented from advancing by the other zero-setting pins 4 which, contrary to the zero stops 3 of the respective numeral stops 2, project downwardly when in their starting position, so that, when adding, those tracer bars 180 which should not produce a representation of the number "one" run against the downwardly projecting zero-setting pins 4 or against the stop rail 6 of the stop bar 5. Thus, by raising one of the zero-setting pins 4, only one a representation of the number "one" is formed in the multiplier mechanism, since the raised zero-setting pin 4 is removed from the path of its respective sensing bar 180 and the latter is able to run up to the stop rail 7 of the stop plate 5 in accordance with the value "one." This value "one" thus traced by the advanced tracer bar 180 is added in the multiplier section at every revolution of the machine in the same manner as the number which has been set up in the multiplicand section. Thereafter, for the purpose of multiplying by depressing the well-known zero key or by gripping the place indicator 9, the pin carriage 1 is shifted to a higher or lower decimal place as described in the copending application Serial No. 346,772, now U.S. Patent No. 2,-823,854. Now the equal key is depressed, whereby the numeral and the representation of the number "one" is likewise added in a higher or lower decimal place, since the raised zero-setting pin 4 then allows the next tracer bar 180 to advance up to the stop rail 7. Although the representation of the number "one" which has arrived by raising the zero-setting pin 4, as well as the multiplicand, are transferred by the rack bars 28 to the listing mechanism, they are not printed inasmuch as that mechanism is not connected. When retracting the rack 28, 30, the multiplicand and the computing number "one" are again removed from the listing mechanism and thereby transferred to the now engaged accumulator 22, 32, 33, and 34. According to the example the "equal" (=) key 188 is to be held depressed, that is, the machine is able to carry out as many revolutions as correspond to the last number of the multiplier in this decimal place, until the numeral "7" appears in the multiplier section B on the number roller 182. Then, by depressing the zero key, the pin carriage 1 in which the multiplicand is set up is moved to the next higher decimal place, for example, as described in the copending application Serial No. 346,772, now U.S. Patent No. 2,823,854, whereby the zero-setting pin 4 which was raised for the computing number "one" (see Fig. 2), also comes to rest over the next tracer bar 8b. Thus, when depressing the "equal" key 188, no other zero-setting pin 4 is moved upwardly, since the locking lever 58 holds the retracting lever 54 in its inactive pivoted position. In this decimal place, in accordance with the example illustrated, only a single machine revolution is produced when the equal key is depressed. Thereafter, for each further decimal place of the multiplier, the zero key is depressed to move the stop carriage 1, and the equal key depressed to turn the machine for the desired number of revolutions. After multiplying the multiplicand with the highest place of the multiplier, the total key is depressed, the key lever 142 thereby being pivoted and taken along by the connecting link of the rod 75, and thus again permitting the printing mechanism to operate and to print the multiplier together with the product. The following result then appears on the tape:

137250×2817=386633250

Also, when the total key is depressed, the pin carriage 1 is returned to its starting position, and, together therewith, the numeral stops 2 and zero stops 3, as well as the zero-setting pin 4 are retracted to their starting position.

When the pin carriage 1 moves toward the left, it continues to run until the rivet 15 hits against the end of the slot 16. It then takes along the place indicator 11 until the extension 13 hits against the stationary stop 14. The pin carriage 1 then stops so as not to exceed the capacity of the multiplier.

If completed multiplications are to be further used, that is, by leaving the multiplicand unchanged and by only changing the multiplier, the product thus computed may be printed as a subtotal, and the next multiplication with the values already computed may be carried out by merely changing the multiplier. However, when registering a substotal, the multiplicand and the representation of the number "one" should remain in the machine. This may be obtained by simultaneously depressing the subtotal key and the repeating key, the result being that the restoring mechanism for the pin carriage then remains inactive. The sensing bars 8b are then pivoted by the lever 71 to the intermediate position so as to permit them to pass freely past the pin carriage 1 and the pawl bar 72. This mechanism permits the value which has been set up to remain in the pin carriage 1 for all computing keys when combined with the repeater key.

The mechanism according to the invention always maintains the required number of decimal places between the right and left parts of the adding mechanism so that, in multiplying by adding the multiplicand, additional higher decimal places will be available in ten-transfer.

Example: 999 999×23

| Multiplier section | Multiplicand section |
|---|---|
| 1 | 999999 |
| 1 | 999999 |
| 1 | 999999 |
| 1 | 999999 |
| 1 | 999999 |
| 23 | 22999977 |

If the machine is to be used for adding numbers with a number of places larger than provided for in the multiplicand section, both sections may be combined by removing the interruption in the live bridge. For this purpose, as shown in Figs. 10 and 11, the lug or head 130 of the slide 128 is pushed underneath the last bridge element 98 of the multiplier section by pivoting the hand operated lever 131 toward the left, as viewed in Fig. 3, which is connected by the link 129 with the slide 128. The bridge 99 then works without interruption over the entire area of the accumulator mechanism. At the same time, the type lever 133 for the equal (=) symbol is moved downwardly so as to withdraw it from the sphere of the platen 48 and to prevent it from printing thereon.

While the foregoing description sets forth in detail what we regard as the preferred embodiment of our invention, it is to be understood that numerous changes may be made therein without departing from the scope of the invention as defined in the appended claims.

Having thus described our invention, what we claim as new is:

1. In a computing machine, in combination, an adding mechanism comprising settable value representing means for representing a multiplicand at one side of said means and a number 1 at the other side of said means, plural value indexing means for adjusting said settable means independently on both sides, driving means, means controlled by said value indexing means which sets up the representation of the number 1 for controlling repeated cyclic operation of said driving means, a split accumulator, means for sensing the respective values set up in said settable means and for transferring them to said split accumulator, said settable means comprising a pin carriage having a denominational series of zero and numeral pins and a stop plate, said stop plate having a plurality of stop rails and a series of zero stop pins thereon, at least one of said stop rails being in line with the row of zero pins, another stop rail being in line with a row of numeral pins representing the numeral 1, and said series of zero stop pins being adjacent said first stop rail and in front of said other stop rail, said zero and numeral pins being movable downwardly by said value indexing means into alignment for engagement by said sensing means, said zero stop pins being movable upwardly out of the path of movement of said sensing means by said value indexing means which sets up the representation of the numeral 1, a listing mechanism, means normally operatively connecting said sensing means and said listing mechanism, said listing mechanism including a plurality of type wheels, a rotary platen and an impression mechanism, said platen and impression mechanism being normally connected with said driving means and means for disconnecting said platen and impression mechanism therefrom, and means for moving said sensing means into an operative position relative to said settable means and for retracting them to an inoperative position relative to said settable means.

2. A computing machine according to claim 1 wherein said disconnecting means is controlled by said value indexing means which sets up the representation of the numeral 1.

3. A computing machine according to claim 1, said listing mechanism being split into separate multiplicand and multiplier sections.

4. A computing machine according to claim 1 wherein said listing mechanism includes a plurality of levers each having a said type wheel thereon, at least one additional lever carrying the type directly thereon, means for moving said additional lever into an operative position ready for printing, and for removing it from such position to an inoperative position.

5. A computing machine according to claim 1, said pin carriage further comprising a second plate, a place indicator mounted on said second plate, said second plate being movable on said pin carriage and adapted to be connected by one of said zero stop pins with said pin carriage and to be thereafter carried along with said pin carriage.

References Cited in the file of this patent

UNITED STATES PATENTS

| | | |
|---|---|---|
| 1,033,109 | Lundgren | July 23, 1912 |
| 1,049,057 | Dalton | Dec. 31, 1912 |
| 1,120,746 | Rinsche | Dec. 15, 1914 |
| 1,320,618 | Hopkins | Nov. 4, 1919 |
| 1,973,437 | Kottmann | Sept. 11, 1934 |
| 2,397,745 | Kiel | Apr. 2, 1946 |
| 2,603,414 | Capellaro | July 15, 1952 |